(12) United States Patent
Hampel (10) Patent No.: US 8,771,568 B2
(45) Date of Patent: *Jul. 8, 2014

(54) OFFSET MOLD TWINNING

(76) Inventor: Lance T. Hampel, Land O' Lakes, WI (US)

(*) Notice: Subject to any disclaimer, the term of this patent is extended or adjusted under 35 U.S.C. 154(b) by 673 days.

This patent is subject to a terminal disclaimer.

(21) Appl. No.: 12/880,498

(22) Filed: Sep. 13, 2010

(65) Prior Publication Data

US 2010/0327478 A1 Dec. 30, 2010

Related U.S. Application Data

(63) Continuation of application No. 11/555,457, filed on Nov. 1, 2006, now Pat. No. 7,807,080.

(60) Provisional application No. 60/733,644, filed on Nov. 4, 2005.

(51) Int. Cl.
*B29C 51/32* (2006.01)

(52) U.S. Cl.
USPC ........................................................ 264/160

(58) Field of Classification Search
USPC ........................................................ 264/160
See application file for complete search history.

(56) References Cited

U.S. PATENT DOCUMENTS

| | | | |
|---|---|---|---|
| 3,954,923 A | 5/1976 | Valyi | |
| 5,470,641 A | 11/1995 | Shuert | |
| 5,624,630 A | 4/1997 | Breezer | |
| 5,635,129 A | 6/1997 | Breezer | |
| 5,885,691 A | 3/1999 | Breezer | |
| 6,408,796 B1 | 6/2002 | Hampel | |
| 6,418,672 B1 * | 7/2002 | Hampel | 52/79.1 |
| 2004/0197547 A1 | 10/2004 | Bristow | |
| 2007/0102840 A1 | 5/2007 | Hampel | |

OTHER PUBLICATIONS

U.S. Appl. No. 11/555,457, Notice of Allowance, May 28, 2010.
U.S. Appl. No. 11/555,457, Amendment, Jan. 27, 2010.
U.S. Appl. No. 11/555,457, Interview Summary, Jan. 26, 2010.
U.S. Appl. No. 11/555,457, Office Action, Nov. 2, 2009.
U.S. Appl. No. 11/555,457, Amendment, Jun. 17, 2009.
U.S. Appl. No. 11/555,457, Office Action, Mar. 17, 2009.

* cited by examiner

*Primary Examiner* — Larry Thrower
*Assistant Examiner* — Xue Liu
(74) *Attorney, Agent, or Firm* — Quarles & Brady LLP (57) ABSTRACT

Thermoplastic parts are made of predominantly single unit thickness but with marginal areas of increased thickness by molding two parts in a common mold having overlapping mold portions. Two thicknesses of thermoplastic material are molded together in the areas of increased thickness at opposite ends of the common mold and the parts are separated from one another by trimming such that each part has an area of increased solid wall thickness and an area of reduced thickness.

20 Claims, 6 Drawing Sheets

OFFSET MOLD TWINNING

CROSS-REFERENCE TO RELATED APPLICATION

This application is a continuation of U.S. patent application Ser. No. 11/555,457, filed Nov. 1, 2006 now U.S. Pat. No. 7,807,080, which claims the benefit of U.S. Patent Application Ser. No. 60/733,644, filed Nov. 4, 2005 and titled "Offset Mold Twinning."

STATEMENT CONCERNING FEDERALLY SPONSORED RESEARCH OR DEVELOPMENT

Not applicable.

FIELD OF THE INVENTION

This invention relates to thermoforming, and in particular, to a method of creating a thermoplastic part with a band of selectively increased wall thickness or double wall features along one or two edges of the part.

BACKGROUND OF THE INVENTION

There is a need on many differing types of plastic parts when only one area of the part has to have substantial wall thickness and the remainder of the part can be thinner. One example of this is the plastic lid on a trash dumpster. The main requirement of a lid on a dumpster is to keep rain and snow out and contain the trash. A lid can be made using very thin material molded with structural ribs that will satisfy both requirements. When such a lid is made of thin material, it typically fails by tearing around the pivot point where the lid is hinged to the container. The most typical method of hinging is by placing a steel rod through holes that are drilled in the ribs or knuckles that are formed in the plastic. The existing technology is that lids are now typically made of thicker material to toughen the hinge area, resulting in a higher cost.

A second example of this need for selectively increased wall thickness is a wall panel of a plastic shelter like a portable animal house for calves or any similar application. The upper portions of the wall are primarily for weather protection. Nearer to the bottom the walls are subject to considerable abuse and need to be stronger and thicker to facilitate fastening to the base, that is often times of another material like wood or solid plastic structural material. Additionally it may be necessary to have the wall material surround a majority of the base. Heretofore such a wall panel would be molded of thicker material in its entirety or constructed using a twin-sheet thermoforming method, at additional cost.

There are numerous other applications also within this category. For example, such applications include liners in semi trailers where the bottom takes a majority of the abuse and the sidewalls of material handling containers to facilitate connecting the panels to the base.

Parts that are made using an injection, compression or casting molding process require an inner and outer mold that is completely filled with the plastic material. Any requisite additional thickness is accomplished by increasing the distance between the inner and outer mold halves and completely filling the space. Parts that are made by thermoforming or blow molding are limited by the starting stock or sheet thickness, typically with pressure or a vacuum on at least one side of the sheet or stock. The subject of this patent is to provide increased stock thickness when using the thermoforming or blow molding process.

Simple common thermoforming utilizes a single sheet of plastic that is heated then molded utilizing vacuum or pressure or both to draw the material into a one sided mold. Once formed, one side of the plastic is against the mold and the other side is open to the atmosphere for cooling. Typically this process is performed on a thermoforming machine of which there are many sizes and configurations.

There also exists a well-known thermoforming process called twin sheet molding. This processing method yields a finished part that is double walled, with inner and outer walls, with varying amounts of space between them. The two sheets of thermo plastic are married in the molding machine and typically fused together at particular areas in an invisible seam completely, or nearly so, around the perimeter and in various other areas advantageous to the application. Twin-sheet thermoforming requires two sheets of plastic heated simultaneously and two molds mounted face to face in the molding machine. Typically twinsheeting is performed on a specially configured thermoforming machine of which there are many sizes. Any shape hollow part can be twinsheeted but the most typical application is large rectangular parts with only several inches or less separating the walls. Other processes are better suited for rounder more voluminous parts like tanks. The advantages of twinsheet thermoforming are numerous, the most important being the ability to make a hollow part that has considerable structural strength and the ability to have differing features on the top and bottom or opposite sides of the part.

Blow molding is a process that shares the same molding system as thermoforming, but the stock in the shape of a tube, called the parison, is extruded into a vertical standing open mold. When large flat parts are molded, a parison stretcher is employed. This mechanism essentially stretches the parison to extend beyond the edges of the mold. The extrusion process provides the heat for the blow molding process. When making a simple flat panel by blowmolding the mold is configured to provide two parts, face-to-face.

All three of the methods, simple and twinsheet thermoforming and blowmolding, require that the molded part be removed from the scrap material around its perimeter. This can be accomplished in many fashions but the preferable way when trimming parts is to rout them.

To enable the routing or other cutting of the parts from the scrap and to separate them, the molded parts must be shaped such that the router bit can separate the material but not cut through the primary part. Additionally, two primary parts as molded must have adequate distance between them to allow access for the trimming equipment. The preferable way to accomplish this is to have the material that creates a twinned band depart from the primary part at a 45 degree angle and then move at a steeper angle away until it becomes the primary part from the opposite cavity—thus providing the tool access space. The steeper angle minimizes the overall length of the tooling, saving cost of the raw material and the tooling.

SUMMARY OF THE INVENTION

The invention is a method of simultaneously molding multiple plastic parts and includes providing a first mold portion and providing a second mold portion facing the first mold portion. The first and second mold portions are offset such that at one or more edges of each of two of the molded parts to be produced by the mold portions an increased thickness area of each part is produced adjacent to a reduced thickness area of each part. Plastic material between the mold portions is molded by pressing two layers of plastic together in the increased thickness areas of each part with each layer forming the reduced thickness area of one of the parts so as to produce the two molded parts connected together by plastic material. The molded parts are separated from one another by cutting the plastic material connecting the parts together so that each molded part includes at least one area of increased thickness and at least one area of reduced thickness.

Objects and advantages of the invention will appear in the detailed description and claims which follow. In the description, reference is made to the accompanying drawings which illustrate a preferred embodiment of the invention.

DETAILED DESCRIPTION OF THE PREFERRED EMBODIMENT

The present invention provides a combination of single sheet and twinsheet thermoforming. The same method works with blowmolding. In the examples described, the parts that are formed are primarily single sheet with a band along one edge that needs to be thicker or twinsheet molded.

The present invention is practiced in one way by mounting two reconfigured single sheet style molds face to face in the thermoforming machine to form two parts. Each of the molds consists of two sections: the primary section that molds one surface of the complete part and the twin section that forms the second surface of the selectively twinned section of the opposite part. The molds are mounted with the primary sections opposite and offset the requisite amount to provide space for the twinning section to mold the twin section of the opposite part. The shape of the twinning section of the mold is such to provide the shape and thickness of the selective twinned portion of the part.

Figure 1A:
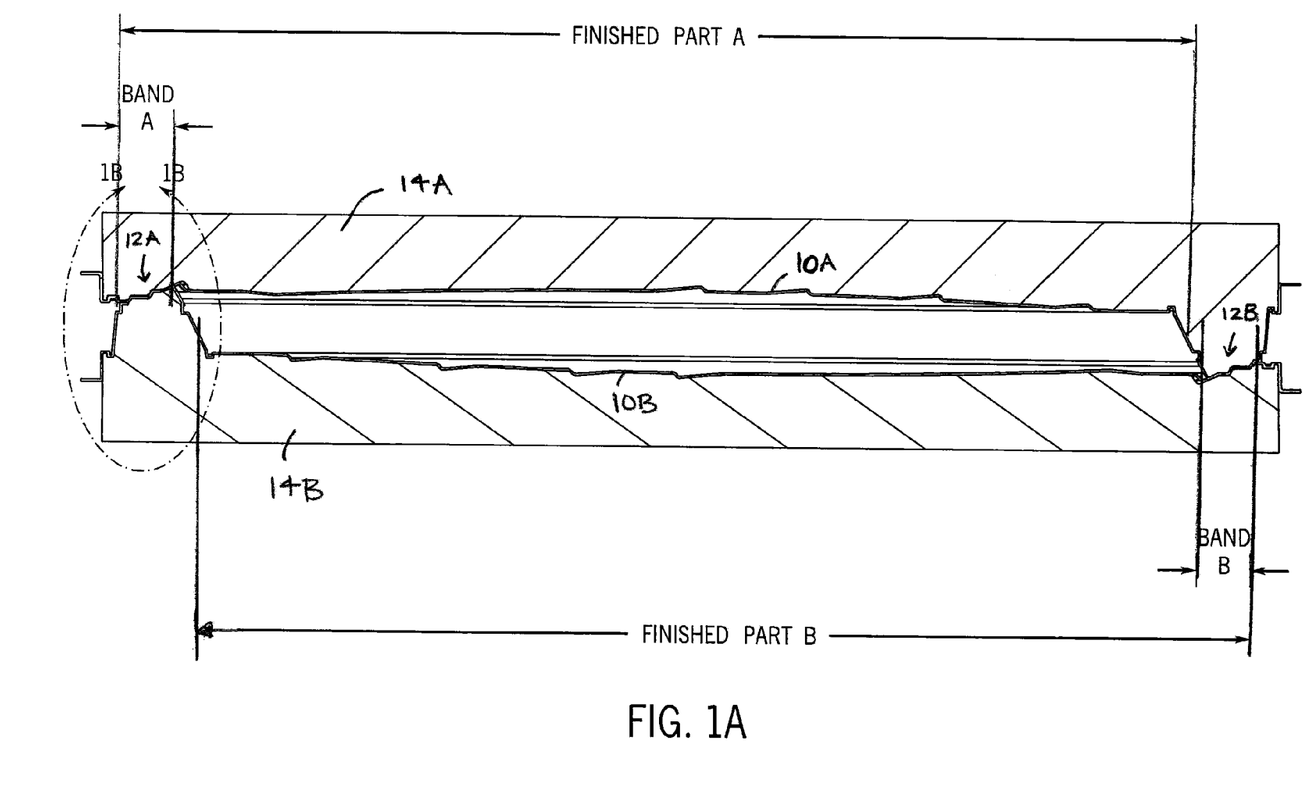
FIG. 1A is a schematic cross sectional view of two mold portions molding two parts (dumpster lids) according to the present invention.
Figure 2A:
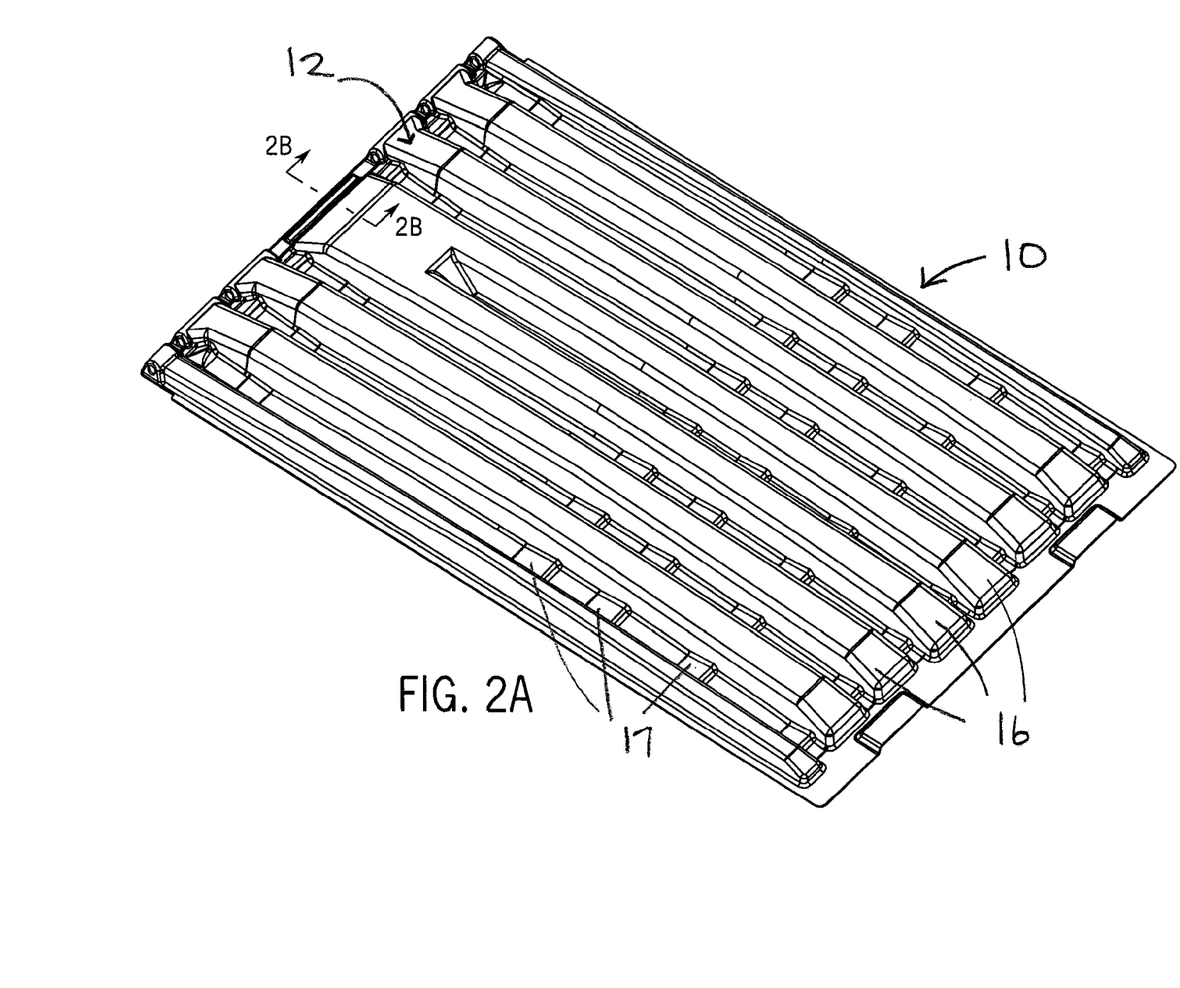
FIG. 2A is a perspective view of a dumpster lid made according to the invention as illustrated in FIG. 1A.
Figure 2B:
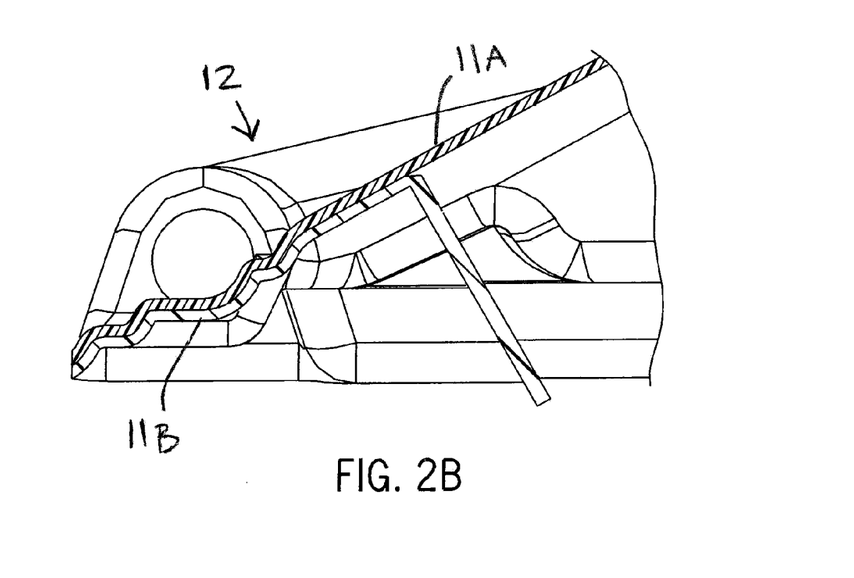
FIG. 2B is a detail cross-sectional view of the lid of FIG. 2A.
Figure 3A:
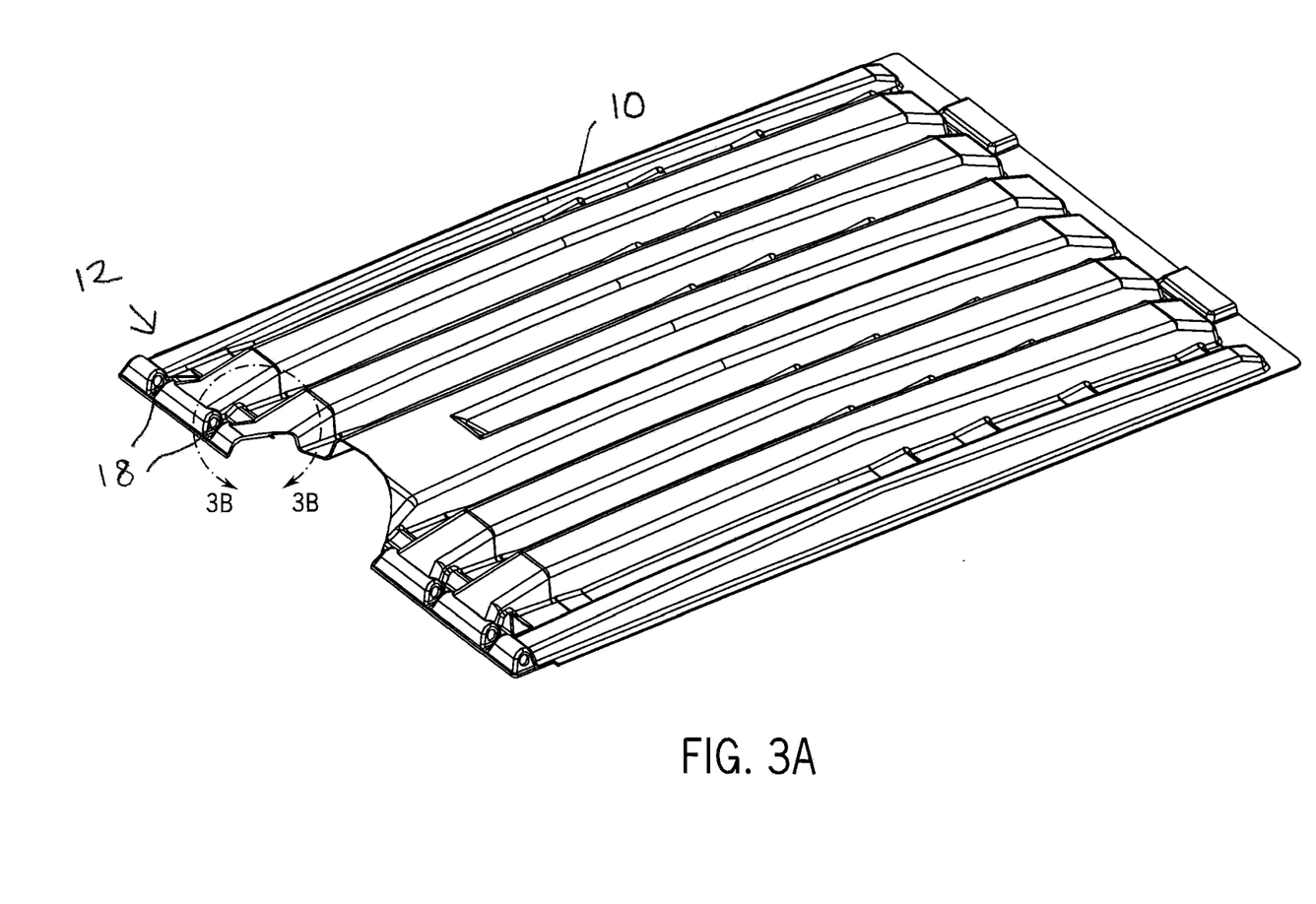
FIG. 3A is a perspective view of the dumpster lid of FIG. 2A and showing a cutaway portion.
Figure 3B:
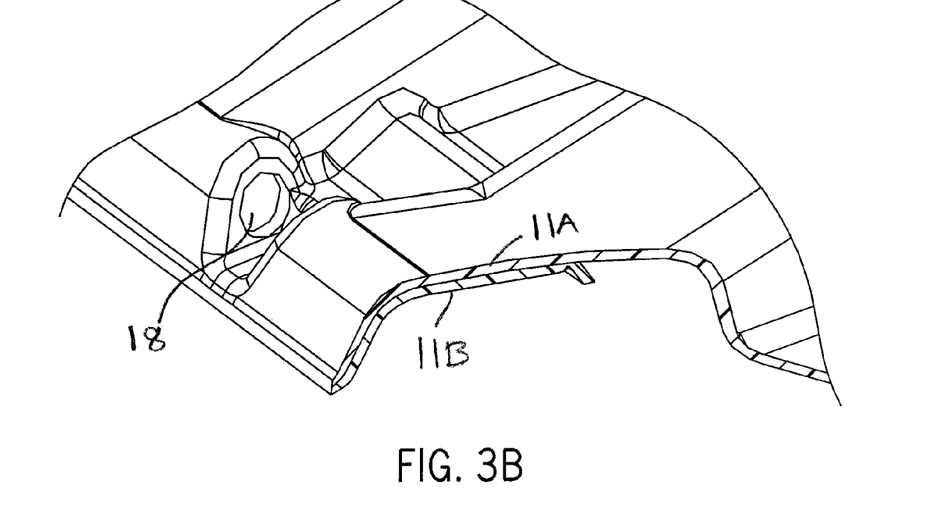
FIG. 3B is a detail view of the cutaway portion of FIG. 3A.

In particular, referring to FIG. 1A, two mold halves 14A, 14B are arranged face to face in the thermoforming machine to form two dumpster lids 10A, 10B having respective hinge areas 12A and 12B. A finished dumpster lid 10 with hinge area 12 is illustrated in FIGS. 2A and 3A. The two lids 10A, 10B are formed as a composite part but are separated after molding. Each mold half 14A, 14B includes a respective first mold portion corresponding to an outer surface of the lid to be formed by that mold half and a respective second mold portion corresponding to the double thickness band of the other finished lid. The length of each finished part is indicated by Finished Part A and Finished Part B. Each finished lid will include a portion having a single sheet (reduced) thickness and a portion having a double sheet (increased) thickness. In FIG. 1A, the length of the band of double thickness, i.e., the selective twinning, is indicated for each part by BAND A and BAND B respectively.

Figure 1B:
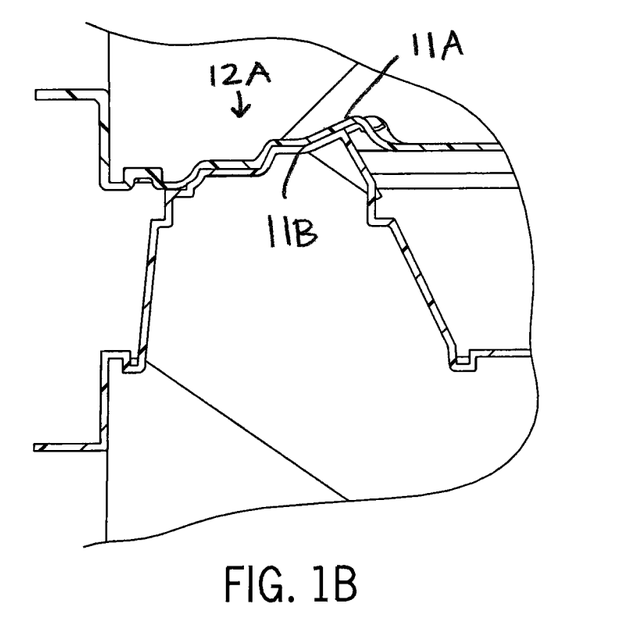
FIG. 1B is an enlarged view of one end of the still connected dumpster lids of FIG. 1A which shows the area of increased thickness on one end of part 10A.

FIG. 1B shows an enlarged view of one end of the still connected dumpster lids of FIG. 1A and better illustrates the area of increased thickness on one end of what will become finished lid 10A. For illustration purposes, the sheet material 11A is delineated from the sheet material 11B in the increased thickness portion.

Referring to FIGS. 2A-2B and 3A-3B, in this example of dumpster lid 10, the finished lid 10 might be 6' long by 4' wide—a typical real size of many different industry sizes. As shown in FIG. 2A, in the finished lid 10, hinge area 12 runs along one 4' edge. Further, the finished lid 10 includes parallel ribs 16 running lengthwise, with ridges 17 between the ribs 16 extending widthwise. The hinge is created by drilling holes 18 (FIG. 3A) in the side surfaces of the ribs near one end of the lid so a steel hinge pin (not shown) can be inserted parallel to the width dimension. The end that will be hinged is slightly different in shape than the opposite end to accommodate the hinging motion. When this new offset twinsheet process is used, the area of the ribs 16 that are drilled for the hinge is molded double thick along the entire width of the lid and extending from the hinge end into the part for several inches, for example three inches. This will require the mold portions to be offset by the required three inches of overlap plus several more inches to accommodate stretching of the sheet and trimming requirements. In this example the required double thick area of 3 inches by 4 feet, the two sheets 11A, 11B of plastic are completely fused together with no space between the two walls. This is accomplished by having the two mold portions closely match with only the space between them equal to the combined thickness of the formed double sheets of plastic. Relief areas are provided to allow a place for excess material to flow to if necessary or if advantageous to the design—like the area around the hinge pin holes in this example.

Figure 1C:
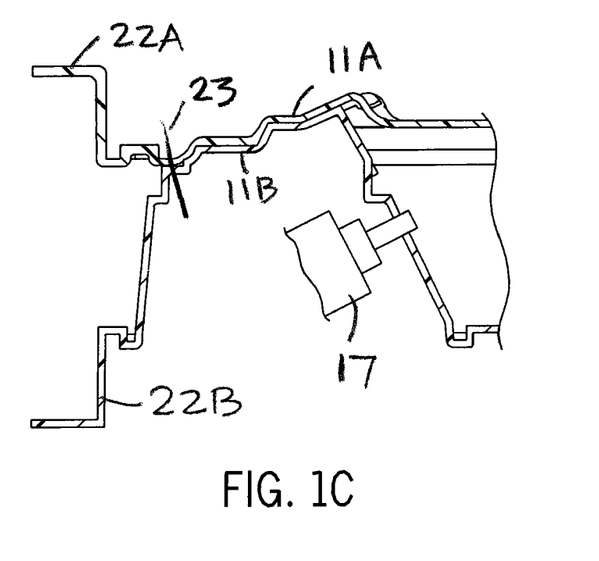
FIG. 1C is a cross sectional view similar to FIG. 1B of the still connected dumpster lids of FIG. 1A after being demolded and illustrating where the composite part could be cut to separate the two parts.

As mentioned, the two lids 10A, 10B are formed as a composite part and are subsequently separated from each other. In particular, as indicated in the detailed view of FIG. 1C, a router is shown to indicate the angled wall area where the lid 10A could be separated from the lid 10B. Other cut locations for separating the parts are also possible, with subsequent trimming to be performed if necessary. It should be understood that a similar cut would be made on the other end as well, with the cuts being made after the composite part is ejected from the molds. These cuts are made on the inner side of the double thickness area that is retained in the respective lid 10A or 10B. There would also be one or more cuts, indicated by 23, made along the outside edge of the increased thickness portions to remove the scrap material 22A and 22B. Again, additional trimming may be necessary depending on the location of first cuts and the desired finished configuration of each part.

Figure 4A:
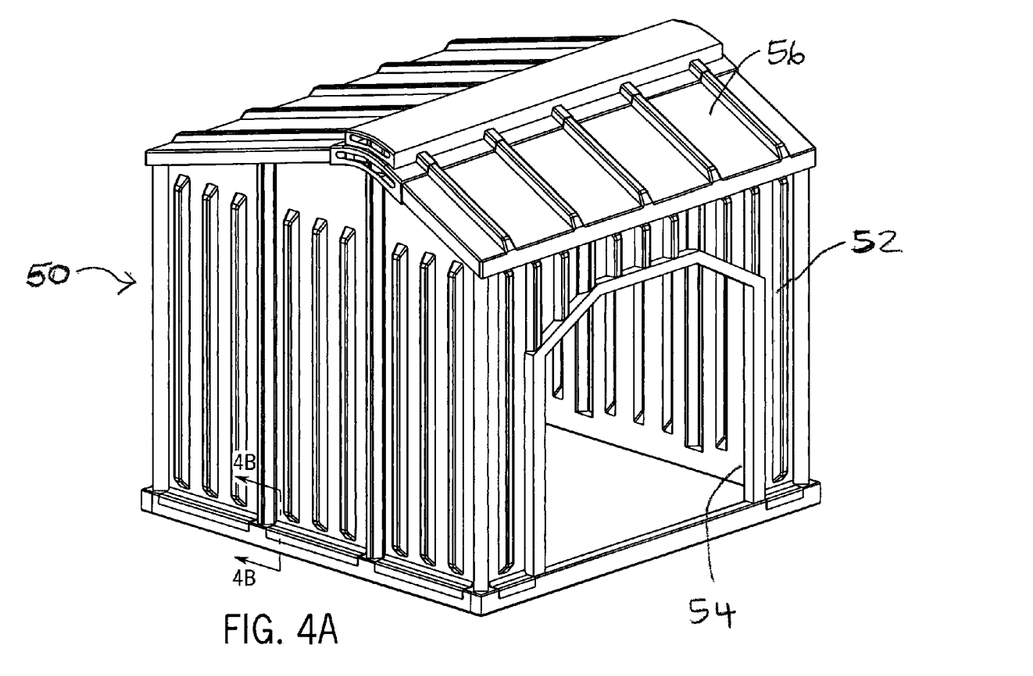
FIG. 4A is a perspective view of an animal shelter made using a method of the invention.
Figure 4B:
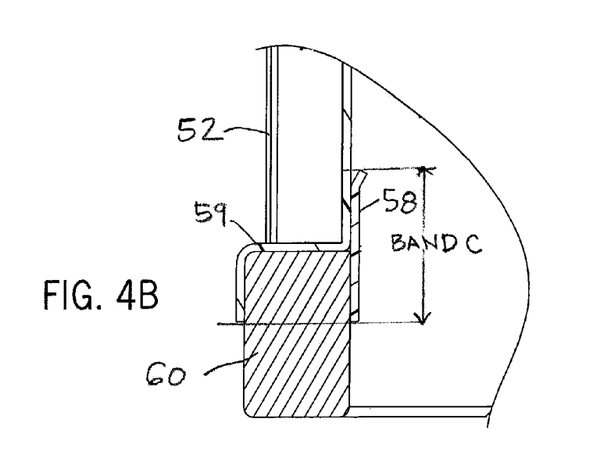
FIG. 4B is a cross-sectional detail view of the lower portion of the shelter of FIG. 4A.

In the example of FIGS. 4A and 4B, a shelter 50 is illustrated. In this case the selective double wall requirement results in a significant amount of the selectively twinned band area of increased thickness to have a space between two walls 58, 59 of plastic, in which a wood or composite base 60 is positioned and assembled to the plastic walls 58, 59 by a bolt or other fastener (not shown). The selectively twinned band, having a length indicated as BAND C, is formed in the same manner as described above, but trimmed at a different location as illustrated in FIG. 4B. The entire shelter 50, which might be 8-feet by 8-feet base dimensions and 6 feet high and consist of four wall panels 52, one of which would be configured so as to provide an entry way 54, and a roof 56. To provide for easy assembly, and a strong mounting system to mount the walls to the structural base, the walls could have the bottom be double walled in a band of selective twinsheeting, with the band having a length of around a few inches to perhaps a foot or so, depending on the dimensions of the structural base member 60. Unlike the completely fused band in the dumpster lid 10, for this application a space or gap would be provided between the walls 58, 59 of the twin band equal to the width of the structural base member 60, which may be for example wood or a composite material for structural rigidity. By having this lower portion of each wall capturing the base on both the outer and inner sides and cladding it from the top, the base is protected from the climate and animal waste. Also, if the side of the shelter 50 is impacted from either the inside or outside of the shelter, the force of the impact is born by the panel 52 rather than the fasteners.

To be cost effective, it is preferred that two identical or nearly so items be molded using the process of this invention. Typically both the parts would be molded using the same starting gauge material; the resulting area of selective twinsheeting would be identical on both parts and effectively double thick. The plastic sheet that is used will be larger than the size that would ordinarily be used to make the part by roughly the amount of selective twinsheeting.

Another variation of this process includes offsetting the two molds in two directions so that two adjacent edges of a part can be selectively twinsheeted.

It is anticipated that often an existing set of single sheet molds could be reconfigured and a twinning section added to utilize a method of the invention.

Preferred embodiments of the invention have been described in considerable detail. Many modifications and variations to these embodiments will be apparent to a person of ordinary skill in the art. Therefore, the invention should not be limited to the embodiments described herein.

The invention claimed is:

1. A method of making at least two molded parts, comprising:
    providing a first mold half having a first mold portion against which a first plastic sheet is molded;
    providing a second mold half having a second mold portion against which a second plastic sheet is molded;
    molding the first plastic sheet and the second plastic sheet between the first mold portion and the second mold portion into a composite part having a first plastic layer and a second plastic layer such that the first plastic layer and the second plastic layer are fused during the molding at a pair of twinning sections forming a first double layer area and a second double layer area, and the first plastic layer and the second plastic layer are not fused during the molding at a primary section forming a first single layer area and a second single layer area; and
    separating the composite part into a first molded part and a second molded part by cutting the first plastic layer in the primary section and cutting the second plastic layer in the primary section;
    wherein the first molded part includes the first double layer area and at least one of the first single layer area and the second single layer area, and the second molded part includes the second double layer area.

2. The method of claim 1, wherein the second molded part includes at least one of the first single layer area and the second single layer area.

3. The method of claim 1, wherein molding further comprises drawing the first plastic sheet toward the first mold portion and the second plastic sheet toward the second mold portion to form a gap between the first single layer area and the second single layer area at the primary section.

4. The method of claim 1, wherein separating further comprises cutting the first plastic layer adjacent at least one of the first double layer area and the second double layer area.

5. The method of claim 1, wherein the first double layer area is along an edge of the first molded part and the second double layer area is along an edge of the second molded part.

6. The method of claim 1, wherein the first double layer area is along two edges of the first molded part and the second double layer area is along two edges of the second molded part.

7. The method of claim 1, wherein separating the composite part into the first molded part and the second molded part further comprises cutting the first plastic layer in the primary section on a first side of a center of the composite part and cutting the second plastic layer in the primary section on a second side of the center of the composite part.

8. The method of claim 1, wherein molding comprises at least one of thermoforming and blowmolding.

9. The method of claim 1, wherein at least one of the first double layer area and the second double layer area includes at least one gap area in which the first plastic sheet and the second plastic sheet are not fused.

10. The method of claim 1, wherein the first molded part and the second molded part are essentially identical in size and shape.

11. A method of making at least two molded parts, comprising:
    providing a first mold portion defining a first primary section and a first twinning section;
    providing a second mold portion facing the first mold portion defining a second primary section and a second twinning section;
    molding a composite part having a first plastic layer and a second plastic layer between the first mold portion and the second mold portion such that the first plastic layer and the second plastic layer are twinned during the molding at the first twinning section forming a first double layer area and at the second twinning section forming a second double layer area, and the first plastic layer and the second plastic layer are spaced apart during the molding at the first primary section forming a first single layer area and at the second primary section forming a second single layer area;
    separating a first molded part from the composite part including the first double layer area and at least one of the first single layer area and the second single layer area by cutting at least one of the first plastic layer at the first single layer area and the second plastic layer at the second single layer area; and
    separating a second molded part from the composite part including the second double layer area.

12. The method of claim 11, wherein the second molded part includes at least one of the first single layer area and the second single layer area.

13. The method of claim 11, wherein the first plastic layer and the second plastic layer are drawn away from the other of the first plastic layer and the second plastic layer during the molding of the first single layer area and the second single layer area.

14. The method of claim 11, wherein molding further comprises drawing the first plastic layer toward the first mold portion and the second plastic layer toward the second mold portion to form a gap between the first single layer area and the second single layer area at the first primary section and the second primary section.

15. The method of claim 11, wherein separating the first molded part and the second molded part further comprises cutting the first plastic layer adjacent at least one of the first double layer area and the second double layer area.

16. The method of claim 11, wherein the first double layer area is along an edge of the first molded part and the second double layer area is along an edge of the second molded part.

17. The method of claim 11, wherein separating the first molded part and the second molded part further comprises cutting the first plastic layer in the first single layer area on a first side of a center of the composite part and cutting the second plastic layer in the second single layer area on a second side of the center of the composite part.

18. The method of claim 11, wherein molding comprises at least one of thermoforming and blowmolding.

19. The method of claim 11, wherein at least one of the first double layer area and the second double layer area includes at least one gap area in which the first plastic layer and the second plastic layer are not fused.

20. The method of claim 11, wherein the first molded part and the second molded part are essentially identical in size and shape.

* * * * *